Figure 1:
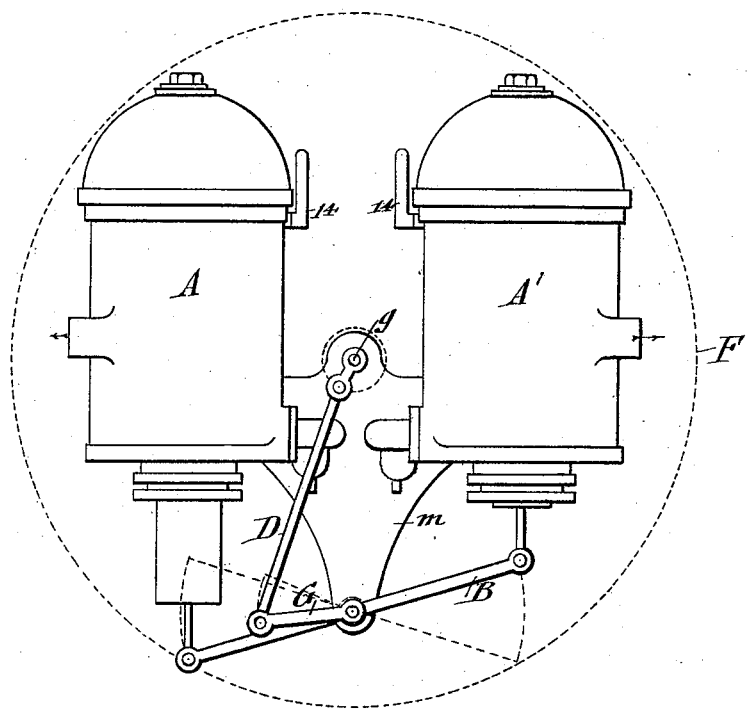

No. 618,401. Patented Jan. 31, 1899.
F. DÜRR.
POWER TRANSMITTING MECHANISM.
(Application filed Sept. 30, 1897.)
(No Model.) 3 Sheets—Sheet 1.

WITNESSES:
M. Henry Wurtzel
George Geibel.

INVENTOR
Friedrich Dürr
BY
ATTORNEYS.

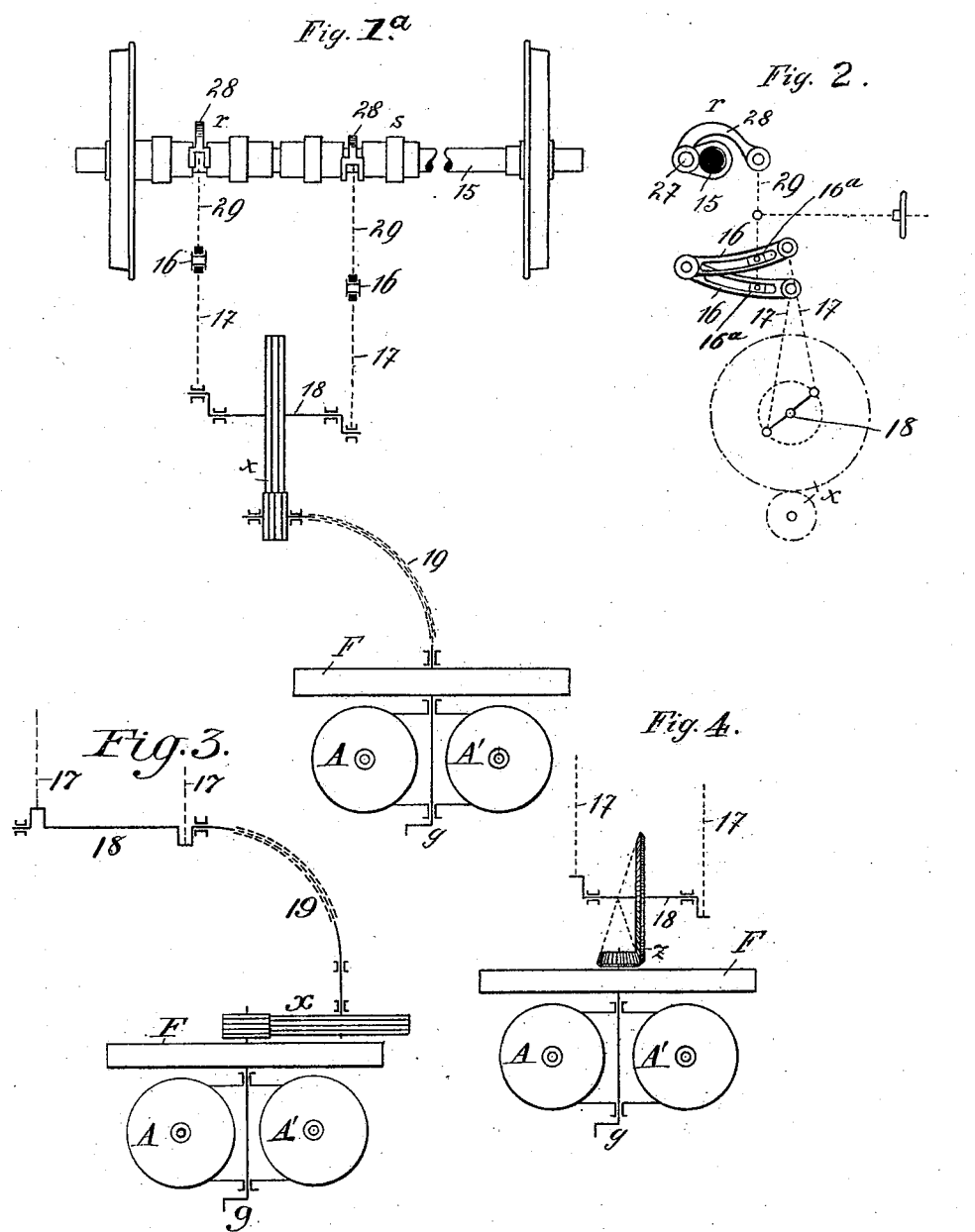

No. 618,401. Patented Jan. 31, 1899.
F. DÜRR.
POWER TRANSMITTING MECHANISM.
(Application filed Sept. 30, 1897.)
(No Model.) 3 Sheets—Sheet 3.
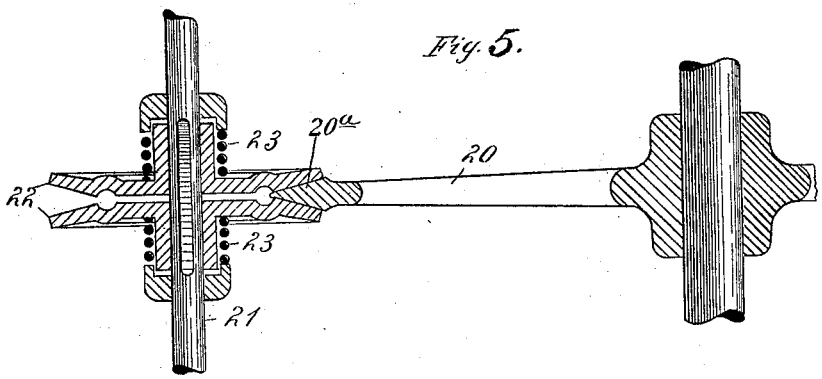
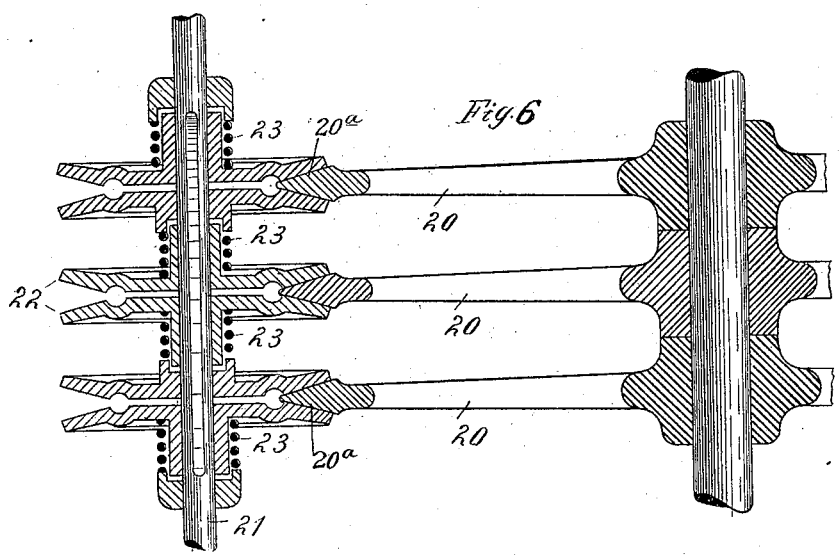
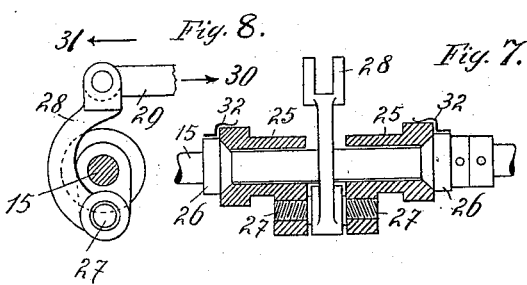
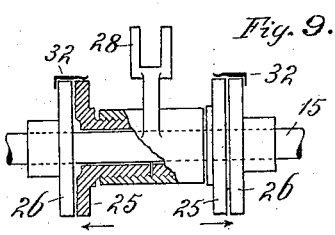
WITNESSES:
INVENTOR
Friedrich Dürr
BY
ATTORNEYS.

UNITED STATES PATENT OFFICE.

FRIEDRICH DÜRR, OF BERLIN, GERMANY.

POWER-TRANSMITTING MECHANISM.

SPECIFICATION forming part of Letters Patent No. 618,401, dated January 31, 1899.

Application filed September 30, 1897. Serial No. 653,551. (No model.)

*To all whom it may concern:*

Be it known that I, FRIEDRICH DÜRR, a citizen of Germany, residing at Berlin, Germany, have invented certain new and useful Improvements in Power-Transmitting Mechanism, of which the following is a specification.

This invention has for its object the use of a peculiar transmission mechanism with a hydrocarbon-locomotive by the use of which, even when the great number of revolutions of the motor remains the same, the speed of the vehicle may be altered at any time.

The further object of the transmitting mechanism is to avoid the deleterious action caused by vibration or jolting while running.

The invention consists of a motor, an axle or shaft provided with a clutch mechanism, and friction-gearing interposed between the clutch mechanism and the motor, the same being composed of spring-actuated parts and a flexible shaft or equivalent by which the rotations of the motor—that is to say, of the shaft—are converted into a progressive or constant rotation, all as will be hereinafter described and then particularly claimed.

In the accompanying drawings, Figure 1 is an elevation of a motor which may be used with the power-transmitting mechanism. Fig. 1$^a$ is a plan view of my improved power-transmitting mechanism. Fig. 2 is a side view of the same with the exception of the motor, the driven axle or shaft being in section. Figs. 3 and 4 are a modification of the connections between the motor and the parts to be driven. Figs. 5 and 6 are detail sectional views of two forms of friction-gearing employed with the motion-transmitting mechanism, and Figs. 7, 8, and 9 are respectively longitudinal sections and side elevations of the clutch mechanism.

Similar letters and numerals of reference indicate corresponding parts.

The motor is provided with two working cylinders A A', which are arranged side by side and transmit a progressive rotary movement to the drive-shaft $g$, arranged between them, and to the fly-wheel F, which is mounted thereon.

$m$ indicates a frame connecting the cylinders A A', and B an oscillating beam which is pivoted on frame $m$ and which through the medium of a crank G reciprocates a link D, connected with the crank-shaft $g$. The pistons working in cylinders A A' rock the beam B in an evident manner.

The transmitting of the rotary motion of the motor to the axle or wheels of a vehicle which is to be driven may be effected in various ways. In Figs. 1$^a$ and 2 the axle 15 of the vehicle is provided with a double clutch mechanism $r$ and $s$, to be hereinafter particularly described, which is connected with a crank-shaft 18 by means of levers 16, having slideways for the slides 16$^a$ of links 29, which are pivoted to levers 28 and by means of links 17 pivoted to the cranks of said crank-shaft. This shaft 18 is rotated from the fly-wheel shaft $g$ by means of a friction-gearing $x$ and a flexible shaft or transmission-shaft 19, composed of hinged sections. The latter causes an oscillating motion of the levers 16, whereby the clutch mechanism $r$ $s$ is set in operation and an alternate progressive or continuous forward movement of the axle 15 takes place.

In the modification shown in Fig. 3 the fly-wheel shaft is directly connected to the friction-gear $x$ and the movement of the latter is transmitted to the crank-shaft 18 by means of the flexible shaft 19. The movement of the shaft $g$ of the fly-wheel may, however, also be conveyed by means of bevel-wheels $z$ to the crank-shaft 18, as shown in Fig. 4; but such means of transfer possesses many drawbacks, more particularly in view of the great number of revolutions of the motor, and hence the form in Figs. 1 to 3 is preferred.

The friction-gearing is constructed as follows, referring to Figs. 5 and 6: As shown in Fig. 5, the ordinary driving friction-wheel 20, which is formed with the wedge-shaped or angular rim 20$^a$, engages in a friction-wheel consisting of two half-disks 22, adjustable against each other on the shaft 21. The adjacent friction-surfaces of the two halves of the disks are pressed equally against the friction-rim 20$^a$ of the wheel 20 by means of springs 23, so that an even wear and tear of the friction-surfaces is insured. An even and steady transfer of power also takes place as the gearing automatically adjusts itself without displacing the axles. In Fig. 6 the gearing is similar, excepting that there is a plurality of the half-disks 22. In all friction-gearing heretofore known, more particularly pulleys with wedge-shaped rims, it is impossible even with the greatest care to prepare the engaging parts or surfaces so exactly as that all of the surfaces come evenly in contact. In the friction-gearing shown in Figs. 5 and 6 the surfaces in question must come in contact, as they only partly belong to a rigid body—that is to say, they accommodate themselves to each other. With a gearing such as shown in Figs. 5 and 6 the driven wheel may consist of two parts or halves having a spring action one against the other, in which case the driving-wheel assumes the form of the driven wheel.

The clutch mechanism $r$ and $s$, referring to Figs. 7, 8, and 9, is constructed as follows: The shaft or axle 15 has arranged thereon two sliding or loose sleeves 25, which sleeves bear against friction cones or shoulders 26 on the shaft and are adapted to be pressed against the same by means of a connecting-screw 27, provided with right and left hand threads. On the screw 27 there is mounted a falciform lever 28, which is connected with one of the two slide-levers 16 by means of a draw bar or link 29, having a pivotal connection with said slide-lever. If the link 29 be moved in the direction of the arrow 30, Fig. 8, the two sleeves 25 will be pressed against the friction-cones 26 and partial rotation of the shaft takes place. If the link 29 be moved in the direction of the arrow 31, the screws 27 are loosened and the sleeves 25 are released from the friction-cones 26. The sleeves 25 may of course be arranged to press inwardly instead of in the direction shown. The adjustment of the sleeves outwardly or inwardly may also be effected in an evident manner by means of an eccentric which bears laterally against the sleeves. In Fig. 9 the sleeves 25 are shown as being directly provided with screw-threads which engage each other, the lever 28 being mounted on the outer sleeve, so that the axial adjustment of the sleeves relatively to each other is produced by the rocking of said lever. In any case the friction between the springs and sleeves must be greater than that of the threads. In order that the sleeves 25 shall not slip on the shaft 15 at the beginning of the forward movement of the lever 28, they are held fast by friction-springs 32, attached to the cones or shoulders 26 and projecting over onto the peripheries of the sleeves 25.

The clutch mechanism $r$ and $s$ may be altered as regards its movement, and the speed of the vehicle thereby varied, by adjusting the link 29 (see Fig. 2) by means of a screw-spindle or equivalent adjusting device in such a way as to alter the leverage of the slide of the lever 16. The clutch mechanisms $r$ and $s$ may also be mounted on a separate shaft in an evident manner, from which shaft motion may be transmitted to the vehicle axle and wheels by means of a suitable chain-gearing.

Having thus described my invention, what I claim is—

1. The combination, with a motor, of an axle or shaft to be driven, clutch mechanism mounted on said axle, a friction-gearing composed of spring-actuated sections, a flexible shaft connecting the latter with the shaft of the motor, and suitable connections between the friction-gearing and the clutch mechanism, substantially as set forth.

2. The combination of a shaft, provided with cones or shoulders, friction-sleeves arranged on the shaft between the shoulders and adapted to be pressed against the same, an oscillating lever supported by said sleeves, and suitable means for connecting said sleeves for producing the opposite motion of the same in either direction depending on the direction of movement of said lever, substantially as set forth.

3. The combination of a shaft, provided with cones or shoulders, friction-sleeves arranged on the shaft between the shoulders and adapted to engage with the same, a screw provided with a left and right hand thread, and connecting said sleeves, and a lever for turning said screw, substantially as set forth.

4. The combination of a shaft, a clutch mechanism arranged on the shaft and comprising friction sleeves or disks, and friction-springs fixed on the shaft and pressing on said sleeves solely for the purpose of producing the friction thereon, said springs being at all times disconnected from said sleeves, substantially as set forth.

In witness whereof I have signed this specification in presence of two witnesses.

FRIEDRICH DÜRR.

Witnesses:
WOLDEMER HAUPT,
HENRY HASPER.